(12) United States Patent    (10) Patent No.: US 7,150,153 B2
Browe                              (45) Date of Patent:    Dec. 19, 2006

(54) RENEWABLE PORTABLE STORED ENERGY POWER GENERATING APPARATUS WITH ALTERNATE WATER SOURCE CAPABILITY

(76) Inventor: David Browe, 2625 Schooner Dr., New Lenox, IL (US) 60451-9238

( * ) Notice: Subject to any disclaimer, the term of this patent is extended or adjusted under 35 U.S.C. 154(b) by 0 days.

(21) Appl. No.: 11/265,661

(22) Filed: Nov. 2, 2005

(65) Prior Publication Data

US 2006/0130481 A1    Jun. 22, 2006

Related U.S. Application Data

(63) Continuation-in-part of application No. 10/073,582, filed on Feb. 12, 2002, now abandoned.

(60) Provisional application No. 60/337,549, filed on Nov. 13, 2001.

(51) Int. Cl.
*F01K 27/00*    (2006.01)
(52) U.S. Cl. ..................... 60/641.1; 60/641.8
(58) Field of Classification Search ............... 60/641.1, 60/641.8, 641.15
See application file for complete search history.

(56) References Cited

U.S. PATENT DOCUMENTS 5,534,159 A * 7/1996 Krieger ................ 210/704
5,979,012 A * 11/1999 Fritz ..................... 15/321
6,096,219 A * 8/2000 Green et al. ............ 210/695
6,393,775 B1 * 5/2002 Staschik ................ 52/79.1
6,765,304 B1 * 7/2004 Baten et al. ........... 290/1 A
2003/0090233 A1 * 5/2003 Browe ................... 320/101

OTHER PUBLICATIONS

"Water Purifier", Time Magazine, Nov. 17, 2003.
"Lake Michigan Danger: The Real Parasites" Conscience Choice, Aug. 2003.
"Water Crisis" U.S. News & World Report, Aug. 12, 2002.

* cited by examiner

*Primary Examiner*—Hoang Nguyen

(57) ABSTRACT

A renewable portable stored energy generating apparatus is provided, comprising a fully contained and stand-alone container. The container includes one or more storage batteries for providing auxiliary electrical power when required, with one or more renewable energy sources, such as solar energy, connected to the storage batteries. A water filtration system is connected to an inlet of a pump, the pump being connected to the storage batteries. An outlet of the pump is connected to an inlet of one of a fresh and salt water filter, the water filter including an outlet that is connected to a water dispensing device. The water filtration system includes a conduit system adapted to deliver water to the pump inlet from alternate water sources, and a valve located in the conduit system. The valve is moveable between a plurality of positions to selectively deliver water to the pump from one of the alternate water sources. The portable apparatus is ready for operation except for the deployment of the renewable energy sources.

20 Claims, 4 Drawing Sheets

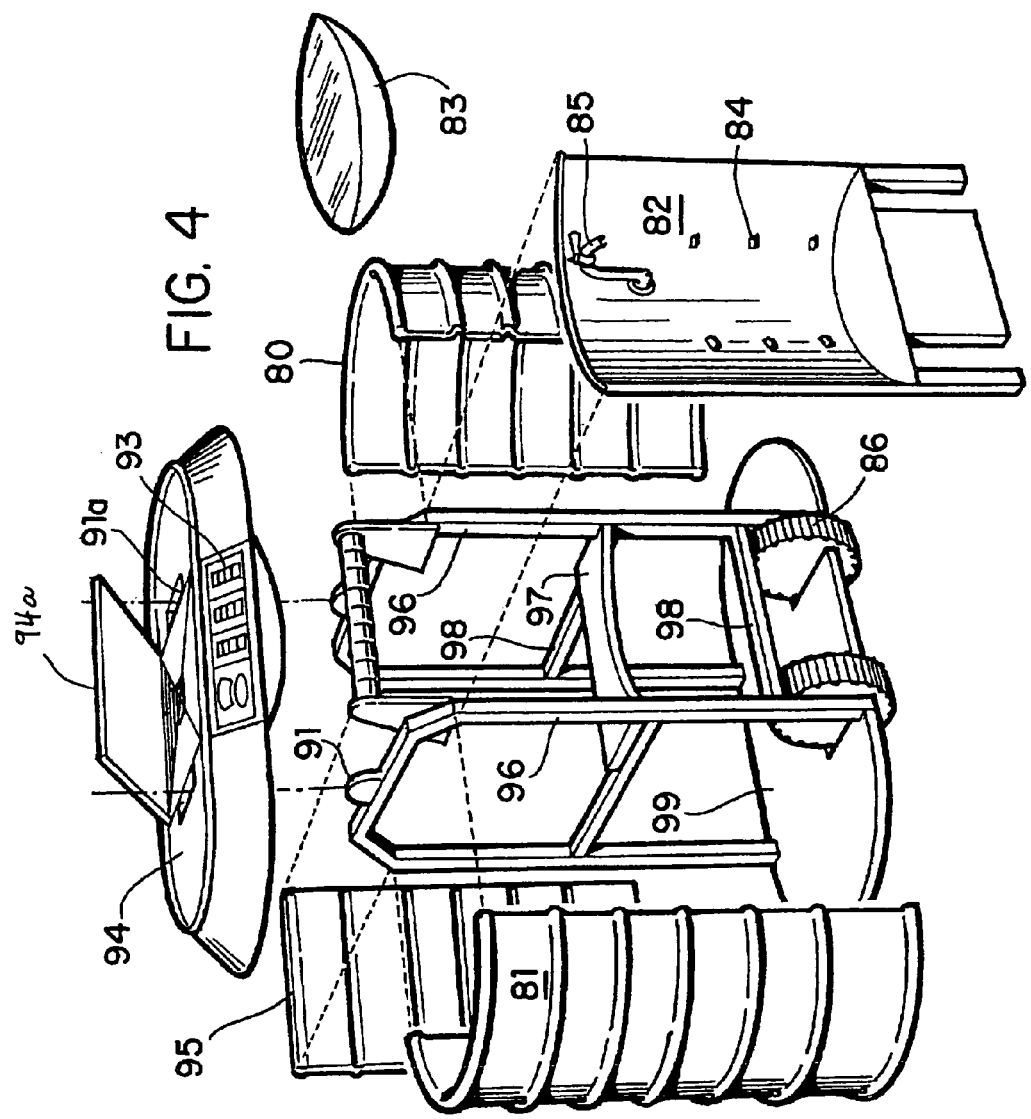

RENEWABLE PORTABLE STORED ENERGY POWER GENERATING APPARATUS WITH ALTERNATE WATER SOURCE CAPABILITY

CROSS REFERENCE TO RELATED APPLICATION

This application is a continuation-in-part based on utility application Ser. No. 10/073,582, filed Feb. 12, 2002 now abandoned, which is based on provisional application Ser. No. 60/337,549 filed on Nov. 13, 2001.

FIELD OF THE INVENTION

This invention relates to a renewable stored energy power generating apparatus and particularly to a system for collecting and storing renewable energy such as solar or wind power and using such energy when needed for water purification and/or an auxiliary electrical power source. The invention is capable of selectively purifying municipal water or non-potable water from another source.

BACKGROUND OF THE INVENTION

During severe storms and other natural disasters, conventional supplies of clean water and electrical power may be disrupted. Solar and wind powered generators have been used to provide auxiliary electrical power. However, these systems have not been available in a compact, conveniently portable package that is relatively inexpensive and easy to store when not in use. Most importantly is the fact that the stored system can easily be set up again once the need arises. Conventional auxiliary power systems are often quite cumbersome and inconvenient for the individual homeowner and small business operator to install and operate. Further, these known systems do not provide the user with an easy to operate system that can alternatively use municipal water as a source of water to be purified, or non-potable water such as rain water, snow, pond water or the like when municipal water is not available.

Fossil fuel powered generators have also been used to provide back-up power. These devices require that gasoline or other fuel be purchased and stored. Such generators can be noisy and smelly to operate. Additionally, gasoline presents a risk of explosion and fire.

In addition to the foregoing limitations of known auxiliary power systems, no renewable energy system is currently available for purifying water in addition to providing electrical power. During an emergency, it may be critically important to have ready access to purified water, as well as back-up electrical power. An auxiliary source of stored, renewable energy would help to meet this need. A convenient, easy to use auxiliary power source that is widely available to the average homeowner and small business would also help to reduce the strain on the power company grid during emergencies and periods of high power consumption.

SUMMARY OF THE INVENTION

It is therefore an object of the present invention to provide a renewable stored energy power generating apparatus that serves as a convenient, compact source of auxiliary electrical power and that includes facilities for purifying fresh water.

It is therefore another object of this invention to provide a renewable stored energy power generating apparatus that permits the users to quickly and reliably produce auxiliary power during emergencies, power shortages or power outages and at other times when such auxiliary power is required or desired.

It is a further object of this invention to provide an apparatus for effectively producing auxiliary power that may be used to readily purify water from alternate sources when a main water source becomes unavailable, and as an auxiliary emergency AC or DC electrical power source.

It is a further object of this invention to provide an apparatus that effectively supplements the user's electrical power needs by employing renewable (e.g. wind or solar) energy sources and which therefore increases energy efficiency, reduces the user's power costs and lessens strain on the utility company's power grid.

It is a further object of this invention to provide a renewable stored energy power generating apparatus that is conveniently packaged as a compact commercially available unit.

It is a further object of this invention to provide a renewable stored energy power generating apparatus that is conveniently portable and easy to store when not in use.

It is still a further object of this invention to provide a renewable stored energy power generating apparatus that is particularly convenient and efficient for use by homeowners and operators of small businesses.

This invention features a renewable stored energy power generating apparatus including a way for collecting renewable energy and transforming that energy into an electrical charge, which charge is transmitted to one or more storage batteries. The storage batteries provide auxiliary power, when required, for one or more desired uses. For example, the auxiliary power may operate a pump and fresh water purification system. The power derived from the batteries may also be employed as a 12-Volt DC power source and/or it may be converted to alternating current and thereby serve as an AC power source.

In a preferred embodiment, the source for collecting and transforming the renewable energy may include one or more solar panels. A conventional wind generating system may also be used. Each battery may comprise a 12-Volt storage battery that is interconnected to one or more 12-Volt DC outlets. Various direct current appliances may be attached to such outlets. The batteries may also be connected to one or more 110-Volt AC outlets by way of a converter that converts the direct current of the storage batteries into an alternating current.

The water filtration system may include a water inlet that is connected through a first conduit segment to an inlet of the pump. The pump may also include an outlet that is connected through a second conduit segment to an inlet of either a fresh or salt water filter. The water filter may also include an outlet that is connected through a third conduit segment to a water dispensing apparatus. A water holding tank may also be communicably interconnected to the outlet of the filter for storing water therein.

The water filtration system may further include a holding tank which may include a five micron input filter for receiving water to be filtered and for accommodating such water until municipal water is disconnected or turned off. When valve 15A is turned open, the holding tank water is drawn through the first and second conduit segments to the 12 VDC pressure activated pump. The pump drives the holding tank water through a standard reverse osmosis water purification system at an effective water pressure of 45 psi and into the clean purified water holding tank. The reverse osmosis water purification system may include a pre-filter and a post filter. A desalination water purification system may indeed be employed in lieu of, or addition to, the fresh water reverse osmosis system.

An enclosure or a complete container may be provided for accommodating each of the components specified above when the components are in use or not in use. The solar panels/wind generator from the enclosure may be mounted to a remote support surface in a stationary manner, or in the case of a container wheels may be or may not be added to facilitate the movement of the container as a unit. Typically, the apparatus is deployed by removing the solar panels and connected wiring from their built in storage area in the enclosure or movable container and mounting them in a desired Southern exposure location on a porch or roof top, even inside a building that has a Southern facing window.

The present invention provides a compact portable apparatus that is relatively inexpensive and which provides reverse osmosis purified drinking water and electrical power to run computers, cell phones, appliances, and the like. An important feature of this invention is that it can purify a municipal water source on a daily basis using pressure from the municipal grid. Should an emergency occur, such as a boil water order issued by authorities because of water contamination, flood, fire, repair of water mains, or the like, a valve is turned which disconnects incoming water from the municipal water supply and the invention allows a user to purify previously non-potable, undrinkable fresh water that can be provided from many sources such as ponds, rivers, snow beds, and the like. The present invention is intended for homeowner and small business use, however, disaster relief agencies such as FEMA, Red Cross, military, local municipalities, and all other relief agencies, could easily disperse units as needed to the areas most requiring clean drinking water and electricity.

BRIEF DESCRIPTION OF THE DRAWINGS

FIG. 4 is an exploded view of the container showing how all the above-mentioned components are housed.

DETAILED DESCRIPTION OF THE INVENTION

Figure 1:
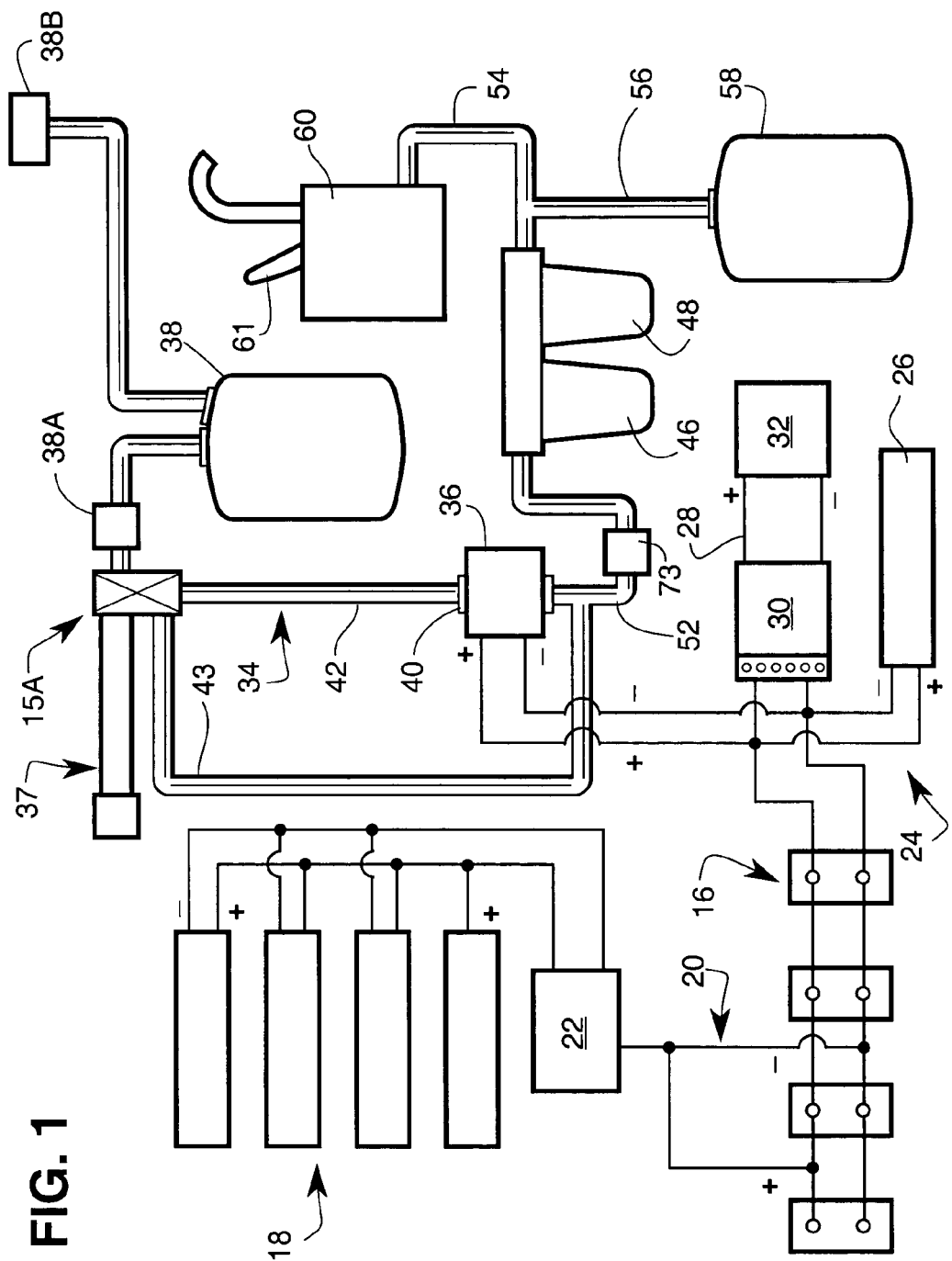
FIG. 1 is a schematic layout of the operational components of the apparatus.

There is shown in FIG. 1 an illustration of the operational components of this apparatus, which are depicted schematically. In particular, the power generating system includes a plurality of 12-Volt Direct Current (VDC) storage batteries 16. These batteries may comprise automobile or similar types of rechargeable storage batteries. A single battery or multiple batteries connected in parallel may be utilized. Various 12 VDC power systems may be employed, i.e., fuel cell technology may or may not be used in place of the common storage batteries shown. Standard 12 VDC storage batteries were chosen because they are most common and obtainable throughout the world.

Renewable power, reaped energy from the sun or wind, is collected and used to keep the storage batteries charged using a standard charge controller 22 (such as an IPC standard 7 amp charge controller) which keeps the batteries from overcharging and prevents electricity from the batteries damaging either the solar panels 18 or an optional wind generator (not shown). These panels 18 are stored and attached, by wires, to the container 12, FIG. 3 when the apparatus is packaged or self contained for sale or while unit is being transported or stored. During use or in preparation for use, the solar panels 18 or optional wind generator are removed from their storage berth in the enclosure or container 12 and are deployed in an appropriate out door location facing in a southerly direction. This may include mounting the panels (or wind generator) temporarily, or permanently on a roof top, backyard, or any other conveniently accessible location that receives optimal amounts of sunlight/daylight. In the embodiment disclosed, four (4) 15-watt panels are utilized. Other numbers of solar panels or collectors may be employed within the scope of this invention. Additionally, these panels and/or wind generators may have assorted power ratings. Each panel and/or wind generator is connected to the battery bank through appropriate electrical wiring 20. The charge controller 22 is interconnected to the wiring between solar panels and/or wind generator 18 and the storage batteries 16. The power collected from the sun and/or wind is converted or transformed into an appropriate electrical charge, which in turn is delivered to the charge controller 22, which then regulates the amperage to the batteries 16 so that the batteries are recharged and store the renewable power as 12 VDC electrical energy. The precise manner of electrically interconnecting the solar panels and/or wind generator to the batteries, through the charge controller so that the batteries maintain an optimal charge of 13.70 VDC, may be altered within the scope of this invention.

Batteries 16 provide auxiliary energy for one or more purposes. For example, the batteries may be interconnected through wiring 24 to a DC outlet 26 such that a 12-Volt DC power source is provided. A pair of such DC outlets 26 are shown at the side of the enclosure or container 12 in FIG. 3. An appliance requiring DC power may be connected to outlets 26 and thus be operated by the stored power.

Alternatively, battery 16 may be connected through wiring 28 to a direct current DC inverter 30, thus converting 12 VDC (volts direct current) to 110 VAC (volts alternating current) and delivered to 110 VAC electrical outlet(s) 32. The DC inverter 30 may comprise a 1000 watt (1 kw), 110 VAC inverter. Other inverters of various wattage ratings may be employed for converting 12 VDC from the batteries 16 to 110 VAC. Assorted 110 VAC appliances may be engaged with outlet(s) 32 which serves as a 110 VAC electrical power outlet. Each of the outlets 32 will be on the exterior of the enclosure or container to be conveniently accessible to the user. In other versions, the alternating current voltages other than 110 VAC, such as 220 VAC single phase can be achieved as an option.

Battery 16 may also provide auxiliary electrical power for pushing water through a standard reverse osmosis water filtration system using a pressure activated 12 VDC pump, which may comprise a Shureflow™ diaphragm pump 36 or a similar pump as would be known to persons skilled in the water filtration industry. Various alternative types of pumps may be employed within the scope of this invention. The filtration system further includes a three (3) gallon fresh water holding tanks 38, with a five micron input filter 38A, and a fill spout 38B that is interconnected through selector valve 15A to an input port 40 of pump 36 by a first conduit segment 42. The conduit segment 42 may comprise a ⅛" feed water line. Holding tank 38 may or may not have lesser or greater than a three gallon capacity; the version shown has a three (3) gallon tank. The water lines are typically composed of plastic material. Various alternative diameter and lengths may be utilized. The purified water holding tank 58 may have alternative holding capacities either less or greater than the standard two point three (2.3) gallons. It should be understood that in alternative embodiments the filter inlet might be attached directly to a conventional municipal water line 37, through conduit segment 43 providing purified drinking water daily from the local utility or municipality. In this way a user may alternate water sources as necessary. Selector valve 15A is turned open and thus selects where source water for the reverse osmosis unit is taken from, either a utility/municipality 37 or from water provided by the user using a five (5) micron input filter 38A and holding tank 38 using fill spout 38B.

Figure 2:
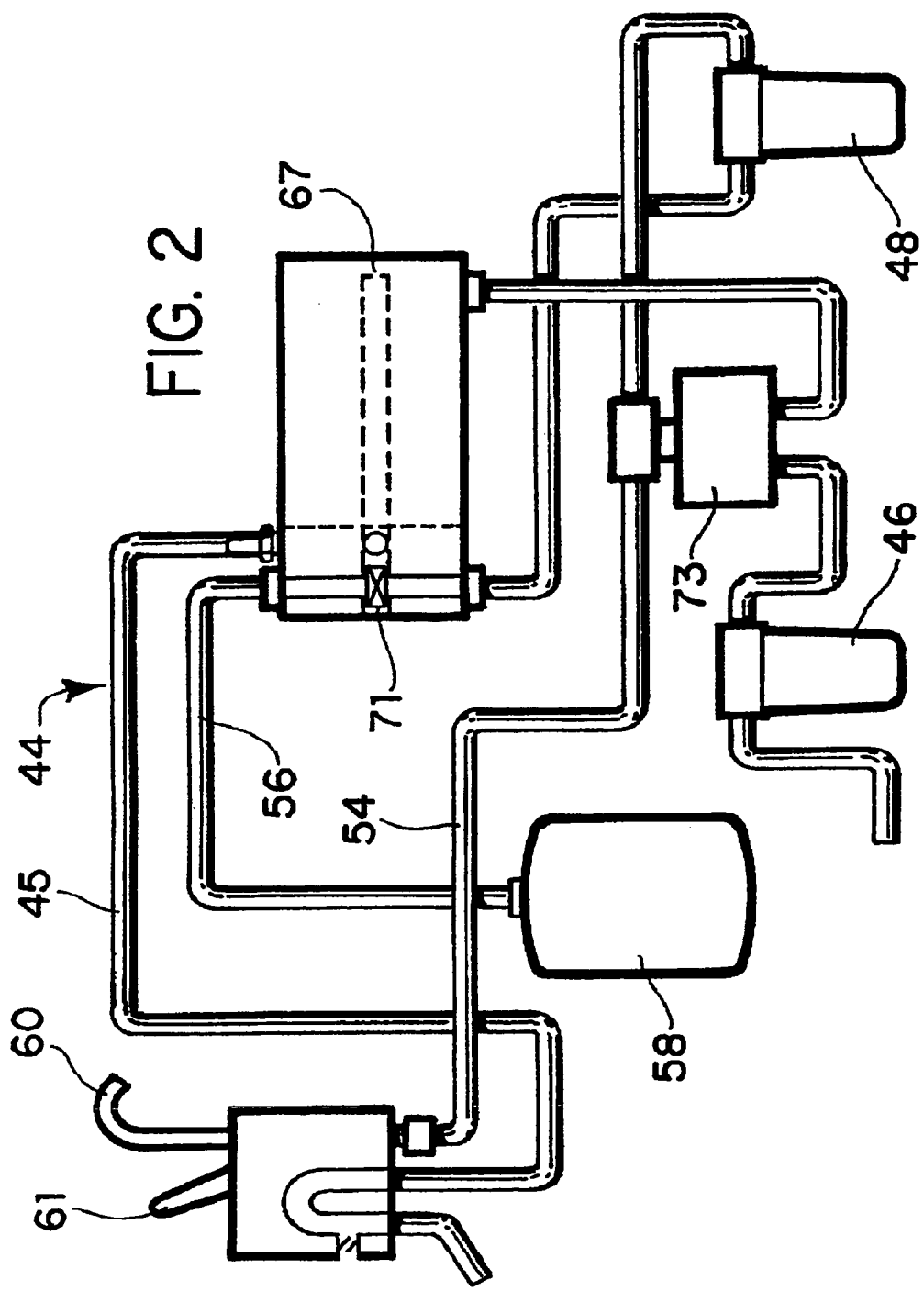
FIG. 2 is a blown-up schematic view of a typical standard reverse osmosis water purification system, which takes its input from either a municipal water source or from the holding tank depending whether valve 15A is open or closed.

The filtration system 34 further includes a standard reverse osmosis water filtration system 44, shown alone in FIG. 2. This standard reverse osmosis water filtration system may include a pre-filter and a post filter 46 and 48, respectively. A Sears™ brand or equivalent standard reverse osmosis unit may be utilized or a comparable standard reverse osmosis water filtration system may be incorporated in the scope of this invention. Indeed, a wide variety of standard reverse osmosis water purification systems may be employed. In certain embodiments, a conventional 12 VDC nautical desalination unit (not shown) may be employed in lieu of or in addition to standard "off the shelf fresh water reverse osmosis filtration system 44. In the version depicted in FIG. 1 the input to standard reverse osmosis filter 44 is controlled by selector valve 15A, which selects either municipal grid water 37 or holding tank water 38. The selected source of water is than pushed into the reverse osmosis filter through conduit segment 52 either by municipal water pressure through conduit segment 43 or from the holding tank 38 through conduit segment 42, using the pressure activated pump 36, depending on which position selector valve 15A is chosen by the user. Once the input to the standard reverse osmosis unit 44 has been selected with selector valve 15A in the embodiment depicted in FIG. 1, the input of reverse osmosis filter 44 is interconnected to final output port 60 through the standard reverse osmosis filter network, and by conduit segments 52, 54, and 56. These conduits may be identical or analogous to water conduit 42 previously described. All connections made are with standard "T" connectors and ⅛" plastic and different line diameters, as chosen by the manufacturer of such standard reverse osmosis water filtration systems. Standard reverse osmosis filter 44 terminates at faucet 60 actuated by depressing lever 61, which dispenses purified water drinking water on demand up to two point three (2.3) gallons per use. This apparatus is self contained and brings water to the location where water is most needed. Users do not have to travel to the unit, the unit travels to the users completely unattached to any buildings, or requiring skilled labor to use.

When the apparatus is not in use, it remains stored in its container or enclosure, solar panels (shown deployed in FIG. 3) slide into the sides (not shown) of the self-contained enclosure or container 12. An optional wind generator (not shown) would also be stored with enclosure/container 12. All components depicted in FIGS. 1 and 2 may be conveniently on or within the enclosure or container 12. To utilize the apparatus, container or enclosure 12 is opened. The solar panels 18 and/or a wind generator (not shown) are removed from in or on the container or enclosure, and deployed in a proper southerly direction and location, as may be depicted in FIG. 3. The solar collectors 18 and or the wind generator (not shown) may remain in the deployed condition on top of the container or enclosure 12, or may be deployed remotely by wires to the container or enclosure. This allows quick and convenient operation of the apparatus when needed day or night. This renewable power that is reaped from the sun and the wind is converted to a direct current (VDC) electrical charge that is stored in rechargeable batteries 16. The energy stored in the batteries 16 is provided, as required, to 12 VDC outlets 26 and 110 VAC (through a 1000 watt inverter not shown) to outlets 30, & 32 FIG. 1. The appropriate direct current and alternating current appliances may be plugged into these respective outlets and utilized as needed.

The batteries 16 also provide 12 VDC power to the pressure activated pump 36 which drives water into the standard reverse osmosis water filtration system 44. The pump 36 is initially turned on by operating a conventional on/off toggle switch (not shown). After pump 36 is turned on, it will run automatically, sensing a drop in pressure from the pressure activation module attached to and located on the pump. In this automatic mode, the pump will maintain approximately 45 psi to force water through the standard reverse osmosis water purification system. Initially the non-potable fresh water to be filtered and purified is deposited into holding tank 38 by means of opening 38B located within the enclosure 12. Activating pump 36 causes the non-potable water from holding tank 38 to be drawn through water line 42. The non-potable water is pumped into pre-filter 46, which removes dirt, sediment and chlorine. The pre-filtered water is forced through a reverse osmosis membrane 67 (FIG. 2) which removes dissolved solids and organic matter in the conventional manner that a standard reverse osmosis water filtration system operates. About eighty to eighty five (80–85%) of the water that is pumped into the reverse osmosis membrane 67 is rejected and drained through the line 45. The remaining water is now advanced through post filter 48 and is now purified and deposited, through conduit segments 54 & 56 into pressurized holding tank 58 and to the dispenser faucet 60. Post filter 48 comprises a carbon filter that removes any remaining tastes and odors from the product water. When purified water is required, the user operates dispenser faucet 60 in a known manner (depress lever 61) such that the purified water is drawn from the holding tank 58 through lines 54 & 56 to dispenser faucet 60. Purified water is then dispensed into an appropriate container for the user to utilize at will.

Reverse osmosis water filtration system 44 includes several other standard features that are shown in FIG. 2. For example, a check valve 71 is located proximate the outlet of the reverse osmosis membrane 67. This membrane comprises a membrane cartridge mounted inside the membrane housing. Check valve 71, FIG. 2, is located in the outlet of the reverse osmosis housing. This check valve prevents a reverse flow of product water from storage tank 58 into the reverse osmosis membrane 67. An automatic shutoff valve assembly 73 responds to a sensor (not shown) detecting that the holding tank 58 is filled to capacity. When this condition is sensed and water faucet 60 is closed, the back pressure in line 54 causes automatic shutoff of valve 73 to close so that the flow of water through the membrane 67 is stopped. After faucet 60 is opened and pressure within line 54 is relieved, the automatic shutoff valve 73 will open and the flow of water into membrane 67 will resume.

Drain 45 is connected adjacent faucet 60 and an appropriate air gap is provided to comply with accepted standard plumbing codes. A standard reverse osmosis water purification system complies with standard plumbing codes, therefore this inventor feels it is unnecessary to further explain the exact operation of a standard reverse osmosis water filtration, as they have been known to persons skilled in the art of plumbing for many years past.

Figure 3:
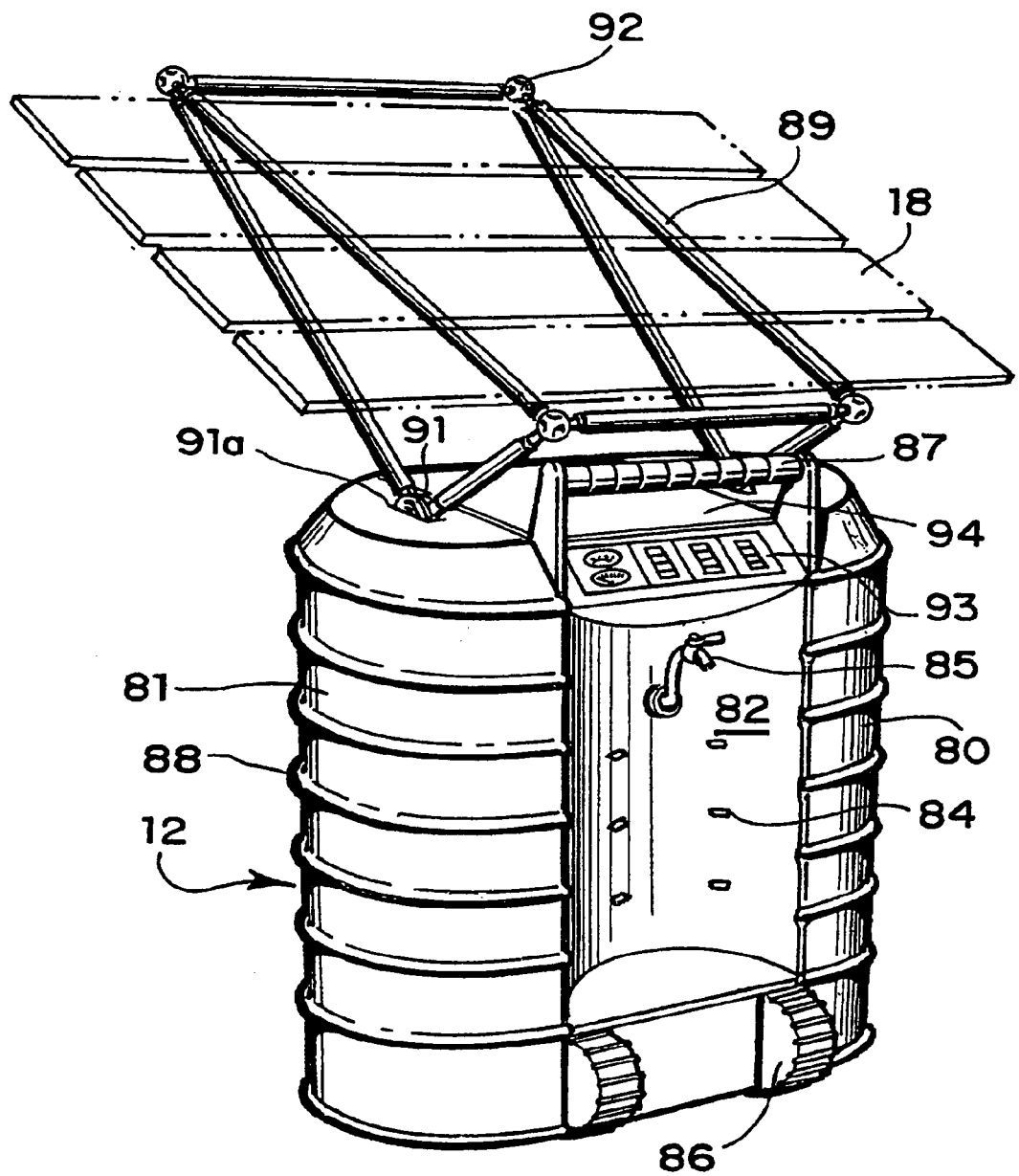
FIG. 3 shows the stand up mobile container which will contain all components when they are in use or not in use.

FIG. 3 illustrates a fully assembled container, although any other container may be used for practicing the invention. The container 12 consists of different panels that may be attached to a frame assembly shown in FIG. 4. To this end, there are two side panels, a left panel 81 and a right panel 80, each the shape of a semi-circle, although any other shape or configuration may be used. The side panels 80 and 81 may be vacuum molded from a high density polyethylene material. Typically these snap on polyethylene covers 80 and 81 will cover a vertical polycarbonate holding tank 38 and a vertical polycarbonate purified water-receiving tank 58 on the other side. The side panels 80 and 81 could also be stamped out of a lightweight metal material, such as aluminum. It is also believed that a vacuum molding process would save material and labor costs. Front panel 82 is preferred to be in a concave shape for esthetic reasons and for practical reasons. At 83 is shown a movable shelf that is adjustable to accommodate various size containers from a simple water glass to a typical five (5) gallon polycarbonate water cooler container, which glass or container can be refilled from spigot 60 (FIG. 1) and same spigot 85 in FIG. 4. Spigot 84 is connected by a line segment within container 12 as shown in FIGS. 1 and 2. The supports for the shelf 83 can be support clips or openings 84 in the concave panel 82. The container 12 itself is mobile by way of wheels 86 which is similar to well known trash containers. To operate the invention, and thereby the container from and to different and various locations, handle 87 is provided which aids in the ease of mobility of container 12. The two- (2) side clip-on panels 80 and 81 exhibit reinforcing ridges 88 (FIG. 3) are useful in adding stability and rigidity to the basic container 12 outer structure. The container 12, is topped off by a cover or top panel 94, which at its front has a control and monitoring panel that contains all of the various controls necessary to the operation of disclosed apparatus. These control and monitoring indicators may or may not include such items as, water pressure to reverse osmosis unit gauge either analog/digital, pressure activated pump on indicator light, low battery or fault indicator light, voltage charging meter, battery voltage meter, key lock master switch, DC amp meter, 110 VAC outlets (2) outlets four (4) individual receptacle, two typical automobile cigarette lighter outlets, city hook up receptacle on or off monitor, and a holding tank water level indicator light. 3$8 Axis door 94a is used for filling holding tank 38 with holding tank input port with non potable fresh water. The top panel 94 has openings 91a on two opposing sides to accommodate semicircle elements 91 which are placed on top frame members 96 (FIG. 4). The elements 91 protrude through top panel 94 to secure top panel 94 to frames 96, 97, 98, and 99. This allows for easy axis to all components, as do all clip on panels previously discussed. This frame assembly is capable of holding all functioning components as previously discussed, such as batteries 16 (FIG. 1), a standard reverse osmosis water purification system 44 (FIG. 2), and a 1000 watt sinewave inverter (not shown) that converts 12 VDC to 110 VAC to provide overload protection for batteries 16 (FIG. 1). Solar panels 18 and frame assembly 89 (FIG. 3) may or may not be constructed consisting of various semi-adjustable struts of circular cross section that are interconnected by frame support nodes, otherwise known as microball connectors 92. The solar panel frame assembly 89 can be assembled in many different sizes and shapes. It all depends on the semi-adjustable lengths of the various struts and number of microball connectors 92 being used. The frame assembly 89 (FIG. 3) on top of container 12 can support multiple and various size solar panels 18 for the purpose as was described with reference to FIGS. 2 and 1. It is also quite possible to support a single and large solar panel on this type of easily assembled frame assembly.

Turning now to FIG. 4, the basic frame assembly consists of right and left frame members 96 which are interconnected by cross pieces 97, 98, 99. and handle 87. The basic side panels 80, 81, rear panel 95 and top panel 94 are easily supported on the basic frame assembly by clips or pre modified tongue and grooves, twist loop fasteners and or dovetail fittings.

When the apparatus is not in use, the solar panels 18 may conveniently be stored inside container 12, or in the case of larger or more than four (4) solar panels, they could be stored on the outside of the container by brackets mounted to the outside of the container.

What I claim is:

1. A renewable stored energy generating apparatus comprising a fully contained and stand-alone container, said container containing at least one storage battery for providing auxiliary power when required, at least one renewable energy source connected to said at least one storage battery, a water filtration system being connected to an inlet of a pump, said pump operably connected to said storage battery, an outlet of said pump connected to an inlet of one of a fresh and salt water filter, said water filter including an outlet that is connected to a water dispensing device, said water filtration system including a conduit system adapted to deliver water to said pump inlet from alternate water sources, and a valve disposed in said conduit, said valve moveable between a plurality of positions to selectively deliver water to said pump from one of said alternate water sources, said apparatus being ready for operation except for a deployment of said at least one renewable energy source.

2. The apparatus of claim 1 wherein said conduit system is adapted to provide water to said pump from a source external of said water filtration system when said valve is in a preselected position.

3. The apparatus of claim 1 wherein said water filtration system includes a holding tank adapted to hold water, said conduit system providing a path to provide water from said holding tank to said pump inlet when said valve is in a preselected position.

4. The apparatus of claim 1 wherein said conduit system is adapted to provide water to said pump from a source external of said water filtration system when said valve is in a first preselected position, and said water filtration system is operably connected to a holding tank, said holding tank adapted to hold a source of water, said conduit system providing a path to provide water from said holding tank to said pump inlet when said valve is in a second preselected position.

5. The apparatus of claim 1, wherein said renewable energy source comprises solar panels.

6. The apparatus of claim 1 including a first water holding tank connected to said outlet of said filter for storing filtered water therein.

7. The apparatus of claim 1 including means for connecting said storage batteries to 12-Volt DC outlets.

8. The apparatus of claim 1 including means for converting said auxiliary power to a 110-Volt AC system.

9. The apparatus of claim 8 including means for connecting said 110-Volt AC system to 110-Volt AC outlets.

10. The apparatus of claim 1, wherein said water filtration system comprises a reverse osmosis system.

11. The apparatus of claim 1, wherein said water filtration system comprises a desalination system.

12. A water filtration apparatus that is self-contained within a stand-alone container, said apparatus including a renewable energy source located on said container and collecting electrical energy which is channeled to electric storage batteries, said electric storage batteries electrically connected to a pump, said pump delivering water from one of alternate water sources to a succession of filters from a storage tank, said pump further delivering filtered water from said filters to a holding tank and from there to a dispenser when needed, a conduit system adapted to deliver water to an inlet to said pump from one of said alternate water sources, and a valve disposed in said conduit, said valve moveable between a plurality of positions to selectively deliver water to said pump from one of said alternate water sources.

13. The apparatus of claim 12, wherein said renewable energy source includes at least one solar energy collector panel.

14. The apparatus of claim 12, wherein said succession of filters is part of a reverse osmosis system.

15. The apparatus of claim 12, wherein said succession of filters is part of a desalination system.

16. The apparatus of claim 1, wherein said container includes a multiple of panels which are fastened to a basic frame assembly.

17. The apparatus of claim 16, wherein said panels include two side panels, a rear panel, a front panel and a top cover panel.

18. The apparatus of claim 17, wherein said top cover panel has two openings at a top surface thereof and wherein a semicircular support element protrudes through each of said openings.

19. The apparatus of claim 18, including a frame support assembly having support struts fastened to each of said semicircular support elements.

20. The apparatus of claim 19, wherein said frame support assembly forms a base for supporting said solar panels.

* * * * *